United States Patent
Gammino

(10) Patent No.: US 8,362,385 B2
(45) Date of Patent: Jan. 29, 2013

(54) APPARATUS AND METHOD FOR SEALING COLLARS OF DOUBLE-WALL BELLOWS AND DOUBLE-WALL BELLOWS SO OBTAINED THAT CAN BE FITTED WITH CRACK MONITORING

(75) Inventor: Salvatore Gammino, Settimo Torinese (IT)

(73) Assignee: Flexider S.R.L., Turin (IT)

( * ) Notice: Subject to any disclaimer, the term of this patent is extended or adjusted under 35 U.S.C. 154(b) by 789 days.

(21) Appl. No.: 12/537,382

(22) Filed: Aug. 7, 2009

(65) Prior Publication Data
US 2011/0031741 A1  Feb. 10, 2011

(51) Int. Cl.
*B23K 9/00* (2006.01)
(52) U.S. Cl. ............. 219/59.1; 219/121.6; 219/121.63; 219/121.64; 219/125.11; 219/244
(58) Field of Classification Search .......... None
See application file for complete search history.

(56) References Cited

U.S. PATENT DOCUMENTS

| | | | |
|---|---|---|---|
| 4,514,613 A * | 4/1985 | Hill et al. ............. | 219/121.13 |
| 5,410,123 A | 4/1995 | Rancourt | |
| 2002/0056291 A1* | 5/2002 | Schultz et al. ............. | 65/392 |
| 2006/0096957 A1* | 5/2006 | Pfiz ............. | 219/121.63 |
| 2008/0057336 A1* | 3/2008 | Kurokawa et al. ............. | 428/639 |
| 2008/0245776 A1* | 10/2008 | Oda et al. ............. | 219/121.63 |

FOREIGN PATENT DOCUMENTS

| | | |
|---|---|---|
| EP | 0 779 417 A2 | 6/1997 |
| EP | 0779417 A2 * | 6/1997 |
| WO | 02/092466 A1 | 11/2002 |

OTHER PUBLICATIONS

European Search Report: EP 07 42 5436.

\* cited by examiner

*Primary Examiner* — Benjamin Sandvik
*Assistant Examiner* — Scott R Wilson
(74) *Attorney, Agent, or Firm* — Ladas & Parry LLP

(57) ABSTRACT

Method in which a continuous butt-sealed rim of a collar defined by corresponding concentric ends, without undulations, of a first wall, radially innermost, and a second wall, radially outermost, of a double-wall bellows is obtained as a continuous butt-weld bead on the corresponding rims, arranged radially adjacent to each other, of the ends of the first and second walls, which have been prepared such that, before welding, they are radially spaced apart from each other by not more than 0.3 mm and with the rim of the second wall that projects in an axial direction with respect to that of the first wall for a length of 0.2-0.4 mm; butt welding is performed with a laser beam directed parallel to an axis of symmetry of the collar, making the latter rotate around the axis to progressively expose the entire perimeter of the rims of the ends of the first and second walls, simultaneously pressing the rims against each other with a force between 1 and 3 kg via spring clamping rollers.

9 Claims, 4 Drawing Sheets

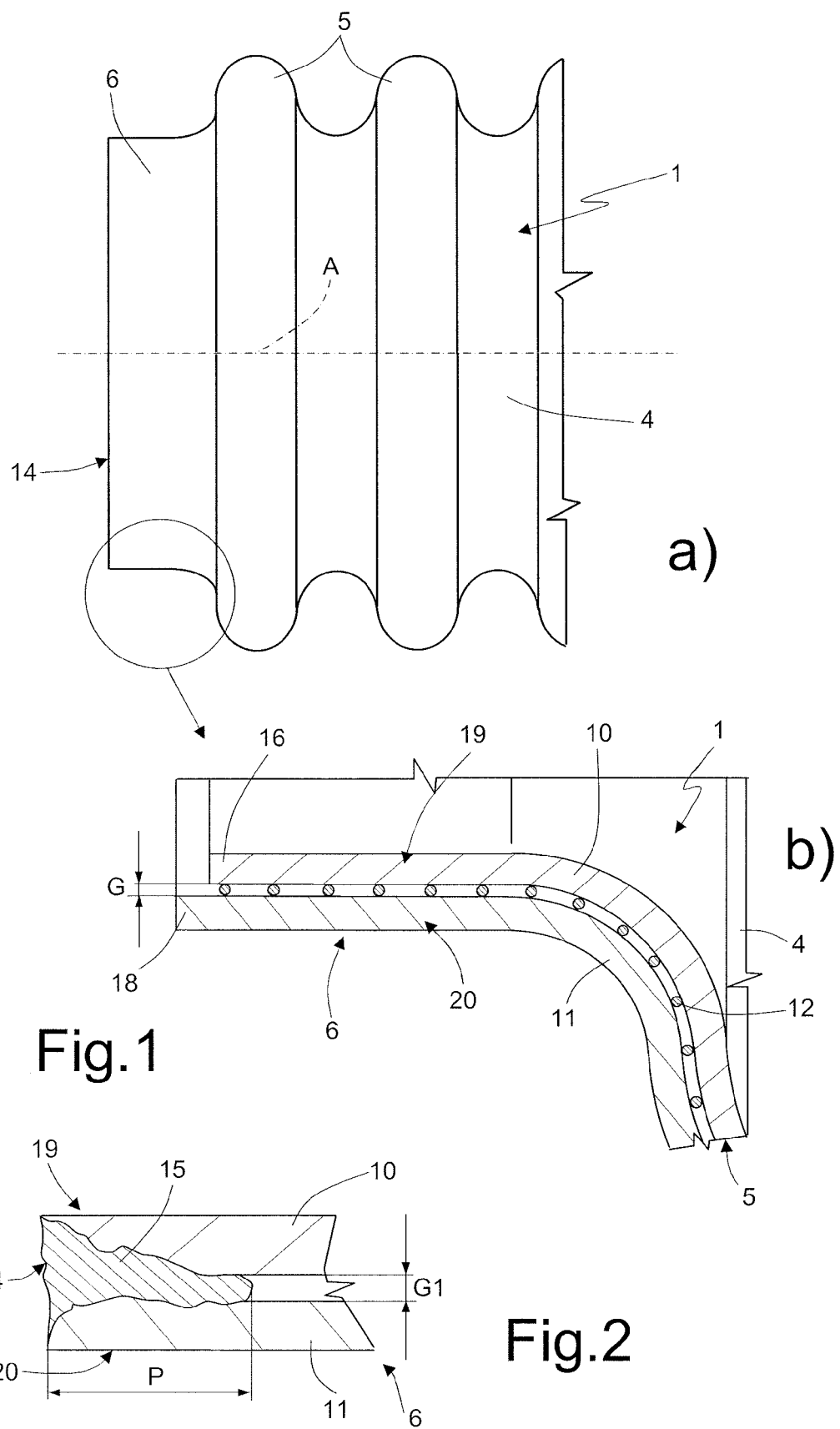

APPARATUS AND METHOD FOR SEALING COLLARS OF DOUBLE-WALL BELLOWS AND DOUBLE-WALL BELLOWS SO OBTAINED THAT CAN BE FITTED WITH CRACK MONITORING

The present invention concerns an apparatus and method for sealing the collars of double-wall tubular-symmetry bellows, of the type that can be equipped with crack monitoring, as well as the bellows so obtained for use in hydraulic couplings traversed by fluids, typically in industrial plants.

BACKGROUND OF THE INVENTION

It is known that for the above-mentioned applications, bellows are used that are made with austenitic stainless steels or superalloys, such as INCONEL for example (for high-temperature applications), having double-walls, a radially outer one and a radially inner one, each one sized to resist the design conditions independently of the other. A spacer, composed of fine-mesh metal netting for example, is inserted between the two walls in order to ensure radial clearance between the two walls that, in the case of failure in the inner wall or the associated longitudinal weld of the latter allows passage of pressure of the fluid contained in the bellow, which is detected by a specially provided instrument located on the straight end, devoid of undulations, of the bellows itself, known as the collar.

In order to allow testing of the double-wall bellows, it is evident that the end rims of the collars, which in use will be welded to the respective end rims of the pipes to be connected via the hydraulic coupling, of which in use the bellows forms part, must be fluid-tight sealed before fitting the bellows itself.

It is clear that user requirements are directed towards sealing systems that cancel, or reduce to the minimum, the risk of leakage after phase of circumferentially welding the bellows to the piping. To this end, the most requested sealing system is that which uses the resistance welding process.

Thus, the most commonly used sealing method exclusively employs manual TIG butt-welding of the rim, with or without the aid of filler metal, in function of the thickness of the walls of the bellows.

Nevertheless, although guaranteeing a high level of reliability, the above-illustrated sealing method does not exclude leakage risks after welding the bellows to the pipes to be connected (a process known as "bellows-pipe welding"), as during the sealing phase it does not allow a weld bead to be obtained on the rim having sufficient depth in the base material (in the axial direction), in terms of fusion, to exclude subsequent leakage without triggering metallurgical and mechanical phenomena that would negatively impact the final characteristics of the coupling.

Secondly, the above-described known art requires a significant amount of time to be carried out (several hours) and the carrying out of monitoring tests for possible leaks.

SUMMARY OF THE INVENTION

The object of the present invention is to overcome the described drawbacks, providing a method and an apparatus to carry out the sealing of the rims of the collars of double-wall bellows in a rapid and reliable manner, with reduced costs with respect to actual ones and which, at the same time, allows the fusion joint of the inner and outer walls of the collar of the bellows to be obtained even at a relatively large distance from the rim of the collar itself, so as to obtain double-wall bellows in which the possibility of leaks during operation after welding the bellows to the pipes to be connected is avoided or at least reduced.

According to the invention, a sealing method for the collars of a double-wall bellows is therefore provided, as claimed in the attached claims.

An apparatus is also provided for embodying the said method, as claimed in the attached claims.

Finally, the invention also regards a double-wall bellows of the type that can be equipped with crack monitoring, as claimed in the attached claims.

In particular, according to one aspect of the invention, a double-wall bellows is provided having at least one of its collar defined by corresponding concentric ends, devoid of undulations, of a first, radially inner wall, and a second, radially outer wall, of the bellows, provided with a continuous butt-sealed rim that is obtained as a continuous butt-weld bead on the corresponding rims, arranged radially adjacent to each other, of the ends of the first and second walls, via the phases of:

preparing the rims of the concentric ends of said first and second walls such that, before welding, they are radially spaced apart from each other by a preset clearance, butt welding the previously prepared rims with a laser beam directed parallel to an axis of symmetry of the collar, making the latter turn around this axis to progressively expose the entire perimeter of the rims of the ends of the first and second walls to the laser beam.

Furthermore, the laser welding phase is carried out by simultaneously pressing the rims against each other with a preset force via radial clamping means, so as to create a butt weld on the rims without filler metal and of a preset depth, measured in the axial direction, equal to at least twice the radial clearance present at the radially adjacent ends of the first and second walls.

Preferably, the preparation phase of the rims of the concentric ends of the first and second walls is carried out such that the rim of the second wall projects in an axial direction with respect to that of the first wall for a length between 0.2 and 0.4 mm, and such that the preset radial clearance between the rims is not more than 0.3 mm and, above all, is substantially constant along the entire perimeter of these rims, which is also achieved by carrying out a collar diameter calibration phase before the welding phase.

The preset clamping force on the rims of the ends of the first and second walls is between 1 and 3 kg.

According to another aspect of the invention, the apparatus for embodying the sealing method of the invention includes at least one support carrying a plurality of rollers on a first side, of which at least one is motorized, arranged in a manner to be able to receive and support a rim of a collar to seal, head clamped at the opposite sides thereof between the rollers, and means for locally butt welding said rim while said at least one motorized roller generates rotary movement of the collar tangential to said rollers, so as to progressively expose the entire perimeter of said rim to said means of welding. According to the invention, the means of welding consist of a laser head carried on a second side of the support, opposite to the first, the support being provided with a through hole aligned with said laser head; in combination, at least some of the rollers are spring-loaded in a radial direction and the rollers are arranged so as to make the rim of the collar pass in front of the through hole during the rotary movement of the collar and to clamp the rim of the collar with a preset force at least in correspondence to the hole.

This hole allows the laser beam generated by the laser head to strike the rim of the collar locally where it is necessary to fuse together the rims of the ends of the first and second walls, thereby achieving the continuous sealing of the collar rim.

In this way, sealing of collar rim can be achieved rapidly (measurable in terms of minutes, as opposed to the hours needed with the procedures of known art) and, above all, completely automatically, consequently achieving very high reliability (no longer tied to the manual ability of the operator) and, at the same time, achieving surprisingly deep welding depths (with respect to the state of the art) on the adjacent rims of the inner and outer walls, measured in the axial direction, without producing any chemical-physical alteration in the metal alloy with which the walls of the bellows are made.

Consequently, possible leaks in operation, after welding the sealed bellows to the pipes to be connected, are all but eliminated.

BRIEF DESCRIPTION OF THE DRAWINGS

Further objectives and advantages of the invention shall become clear from the description that follows of a non-limitative embodiment thereof, provided purely by way of example and with reference to the figures in the enclosed drawings, wherein:

FIG. 1a shows a longitudinal view in elevation of a double-wall bellows of the type destined to equip a fluid-tight connection coupling for pipes and/or industrial plants, FIG. 1b shows an enlarged-scale, sectioned longitudinal view of an end without undulations, or collar, of the bellows in FIG. 1a, prepared for having the sealing method according to the invention carried out on it, FIG. 2 shows an even larger scale sectioned longitudinal view of a terminal section of the collar of the bellows in FIG. 1a after carrying out the sealing method according to the invention.

DETAILED DESCRIPTION OF THE INVENTION

Figure 3:
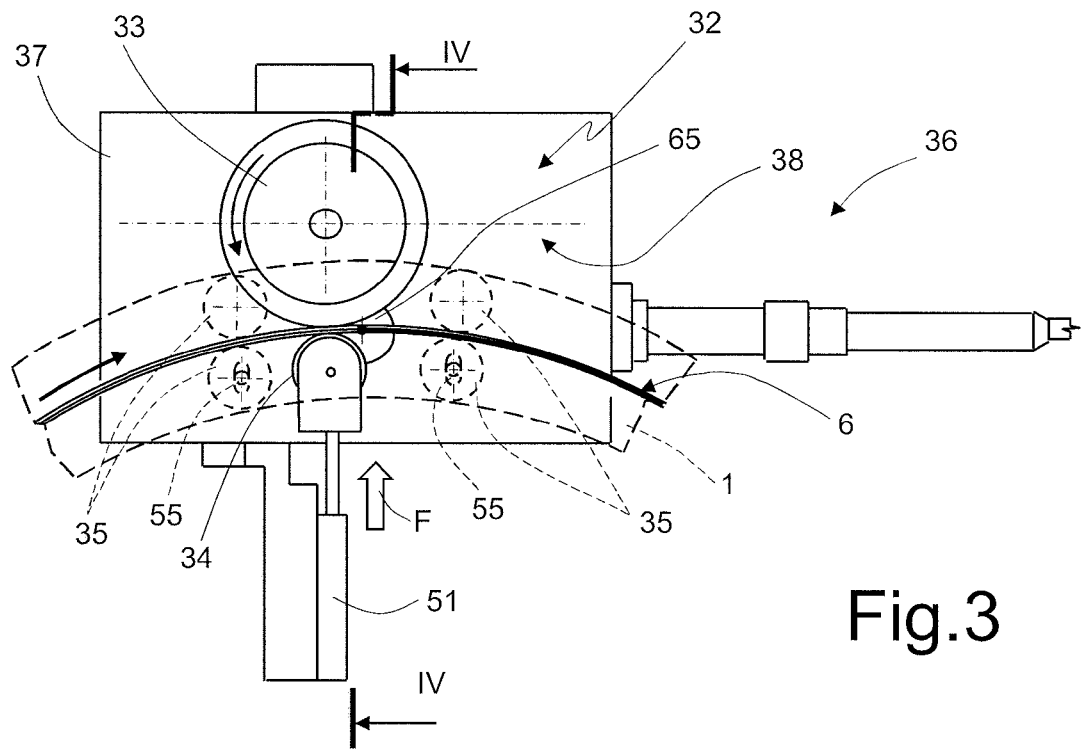
FIGS. 3 and 4 show a front view in elevation and a three-quarters side-perspective view, sectioned along a trace plane IV-IV, of an apparatus for performing the sealing method according to the invention and a welding phase carried out according to this method.

With reference to FIGS. 1 and 2, reference numeral 1 indicates a double-wall tubular-symmetry bellows as a whole, of the type that can be fitted (in a known manner and which is therefore not shown for sake of simplicity) with crack monitoring for use, for example, in a hydraulic coupling through which hazardous fluids flow in industrial plants (known and again not shown for sake of simplicity).

The bellows 1 comprise (FIG. 1a) a central portion 4 provided with undulations 5, and opposite cylindrical end portions, deprived of undulations 5, defining respective cylindrical connection collars 6, in use destined to be joined to respective opposite sections of piping to be connected (not shown); for simplicity, as the bellows 1 is symmetrical, only the left-hand collar 6 is shown, on the understanding that what shall be described is also identically applicable to the collar 6 at the opposite end.

Both the central portion 4 and the end portions forming the collars 6 are defined by a first tubular wall 10 and a second tubular wall 11, respectively the radially inner one and the radially outer one, mounted concentrically and between which a spacer element 12, composed of a metal net for example, is inserted.

The collars 6 are delimited at their own free opposite ends, each one by a respective continuous butt-sealed rim 14 defined as a continuous butt-weld bead 15 of corresponding rims 16 and 18, arranged radially adjacent to each other, of respective corresponding ends 19 and 20 of the first and second walls, 10 and 11 respectively.

According to one aspect of the invention, the continuous weld bead 15 has been obtained by laser butt welding and without filler metal on the rims 16 and 18 of the corresponding ends 19 and 20 of the walls 10 and 11, such that it has a weld depth P, measured in an axial direction, or rather parallel to an axis of symmetry A of the bellows 1 and the associated collars 6, equal to at least twice the radial clearance G1 present between the ends 19 and 20 of the walls 10 and 11, the ends 19 and 20 being radially adjacent, but in fact separated from each other by clearance G1.

In particular, according to the invention, the weld bead 15 is obtained as a consequence of a sealing method of the collars 6 of the bellows 1, in which the continuous butt-sealed rim 14 of each collar 6 is in fact defined by a continuous butt-weld bead on the corresponding rims 16 and 18, arranged radially adjacent to each other, of the ends 19 and 20, comprising the phases of:

preparing the rims 16 and 18 so that before welding (FIG. 1b), they are radially separated from one another by a preset clearance G, and butt welding the previously prepared rims 16 and 18 via a laser beam 30 (FIG. 4) directed parallel to axis A, while at the same time making the collar 6 turn around axis A so as to progressively expose all of the corresponding perimeter of the rims 16 and 18 of the ends 19 and 20 to the laser beam 30.

Figure 4:
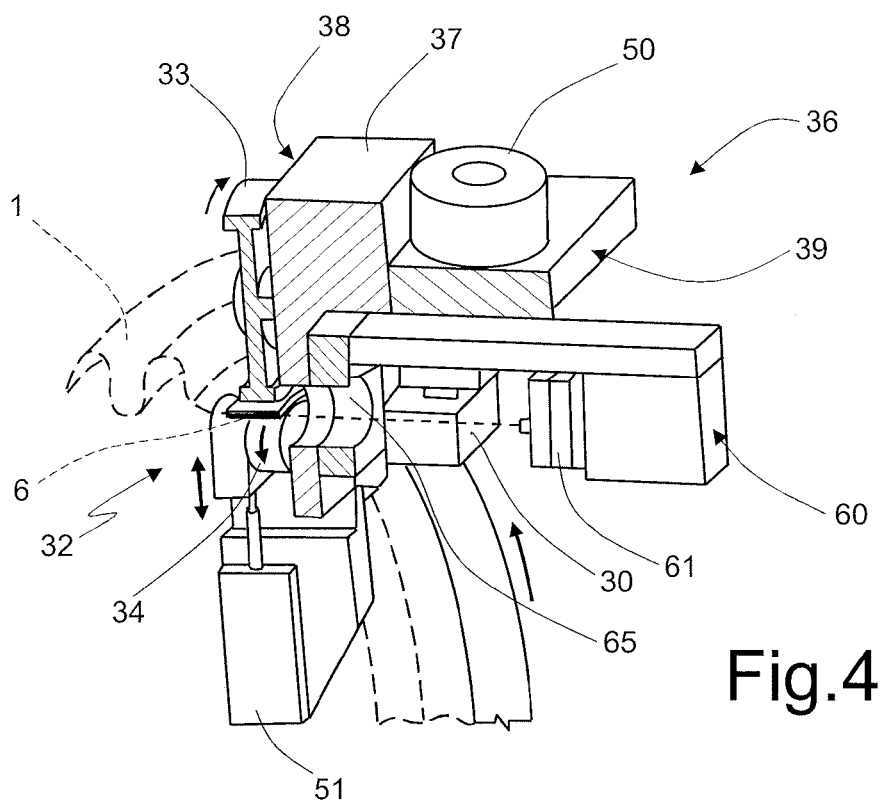

According to another aspect of the invention, the laser welding phase, shown in detail in FIGS. 3 and 4, is carried out while simultaneously pressing rims 16 and 18 against each other via radial clamping means 32, with the latter exerting a preset radial force F on the rims 16 and 18 of the walls 10 and 11 of the collar 6, so as to achieve butt welding of the rims 16 and 18 without filler metal and for a preset depth P.

In particular, it has been experimentally determined that to achieve optimal welding results, both in terms of the immediate result and, above all, in terms of long-term reliability, the weld depth P measured in the direction of axis A must be equal, or preferably greater than, at least twice the radial clearance G1 present between the concentric ends 19 and 20 of the first wall 10 and the second wall 11 and, in absolute terms, must be equal or greater than 2.6 mm, while the preset radial clearance G present between the rims 16 and 18 immediately before the laser welding phase must not be more than 0.3 mm and, above all, must be substantially constant.

Figure 5:
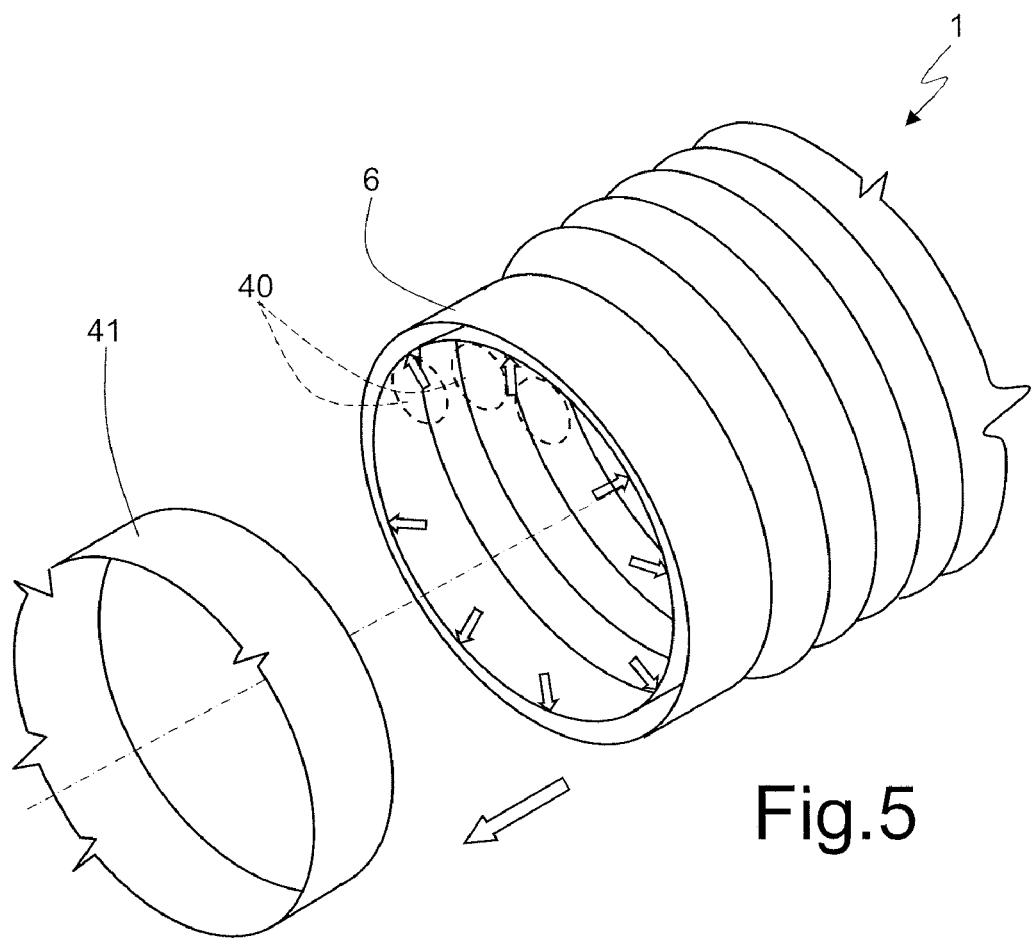
FIG. 5 shows a perspective view of a further phase of the invention's sealing method.

To this end, the method according to the invention also includes a calibration phase for the diameter of the concentric ends 19 and 20 forming the collar 6 and the radial clearance G1 present between the walls 10 and 11, which is carried out (FIG. 5) by radially pressing the end 19 of the inner wall 10 against the end 20 of the outer wall 11, from the inside out as schematically shown by the radial arrows in FIG. 5, via first (known) calibrator means 40 arranged inside the end 19 of the wall 10 and cooperating with second (known) calibrator means 41 arranged on the outside of the end 20 of the second wall 11 of the bellows 1. For this reason, the radial clearance G might not be identical to the radial clearance G1 and, in general, will be slightly smaller than clearance G1, but above all, according to one aspect of the invention, it will be substantially constant, whilst the clearance G1, close to the central portion 4 of the bellows 1 in particular, can vary according to the angular position considered.

In any case, according to a further aspect of the invention, the preparation phase of the rims 16 and 18 is carried out such that the rim 18 of the radially outermost wall 11 of the bellows 1 projects in the axial direction, or rather along axis A, with respect to the rim 16 of the radially innermost wall 10 of the bellows 1, for a preset absolute distance of between 0.2 and 0.4 mm. Similarly, it has been experimentally determined that the preset radial force F to exert on the collar 6 during the laser welding phase must be relatively low and approximately between 1 and 3 kg.

To this end, radial clamping means 32 consisting of idler and/or motorized rollers 33, 34 and 35, at least some of which are spring-loaded in a radial direction (rollers 35 for example), are used.

According to the invention, the sealing method also comprises a chemical preparation phase for the radially adjacent rims 16 and 18, including at least a drying phase for the bellows 1 to eliminate any residual humidity and at least a solvent spray wash phase for the rims 16 and 18. The calibration phase described earlier on is carried out after the chemical preparation phase for the rims 16 and 18, so that the chemical preparation of the rims 16 and 18 can be more effective.

According to that shown in detail in FIGS. 3 and 4, the described method of sealing by laser welding is carried out using an apparatus 36 for sealing the rims 16 and 18 of the collars 6 that is also part of the invention.

The apparatus 36, includes at least a support 37 carrying on a first side or face 38 a plurality of rollers 33, 34 and 35, of which at least one, in the case in point a roller 33 of larger diameter than the others, is driven by a motor 50 mounted on the support 37, which also contains/carries a suitable mechanical transmission to the roller 33, of obvious embodiment for a person skilled in the field and therefore not shown for sake of simplicity.

A roller 34, preferable an idler, is carried diametrically opposite to the motorized roller 33 in a radially mobile manner by the support 37, mounted, for example, on the end of a linear actuator 51 (hydraulic, pneumatic, electrical, mechanical, etc.), possibly consisting of a simple spring, in turn integrally mounted on the support 37 in a radial direction and able to radially press rollers 33 and 34 against each other, with the rims 16 and 18 of the walls 10 and 11 of the collar 6 pinched between them, with the already described radial force F of preset magnitude.

In the non-limitative example shown, the support 37 also carries a plurality of idler rollers 35 on its side 38, in the case in point two pairs of rollers 35 radially opposite to each other, placed on both sides of the rollers 33 and 34, at least the rollers 35 acting radially on the inside of the collar 6, being radially loaded by springs 55.

In any case, the rollers 33, 34 and 35 are arranged in a manner to be able, in use, to receive and support a rim of a collar 6 to be sealed, consisting of the free end of this collar 6 defined by the rims 16 and 18 radially adjacent but spaced apart from each other, head clamped at the opposite sides thereof between such rollers.

The apparatus 36 also includes means 60 for locally welding the collar rim defined by the rims 16 and 18 placed head to head adjacent, while the said at least one motorized roller 33, by exerting friction on the outer surface of the collar 6, generates rotary movement of the collar 6 tangential to the rollers 33, and 35, so as to progressively expose the entire perimeter of collar rim, or rather the adjacent rims 16 and 18 to the means of welding 60.

According to the invention, the latter consist of a laser head 61 carried by the support 37 on a second side or face 39 of the support, opposite to the first. The support 37 is also provided with a through hole 65 with the axis aligned with the laser head 61 to allow the laser beam 30 it produces to pass through the support 37 and onto the collar 6. The rollers 33 and 34 and the radially-sprung rollers 35 are, in fact, arranged so that in use, they make the collar rim defined by the adjacent rims 16 and 18 move in front of the through hole 65 during said rotary movement of the collar 6 and clamping them with the said preset force F at least in correspondence to hole 65, this being achieved in the shown case in point via the actuator 51 and the roller 34, which is radially pressed against the inside of the collar 6 and against the motorized roller 33, in this way also facilitating the transmission of motion by friction from the latter to the collar 6.

Lastly, according to that shown in FIG. 3, the hole is preferably positioned slightly offset in the circumferential direction with respect to the rollers 33 and 34 that, in use, exert the radial force F on the rims 16 and 18 and, more specifically, is shifted with respect to the point of application of the force F (tangent point between the rollers 33 and 34, and the cylindrical collar 6) immediately downstream of it, with reference to the direction of rotation of the collar 6 and the rollers 33 and 34, indicated by the arrows in FIG. 3.

Figure 6:
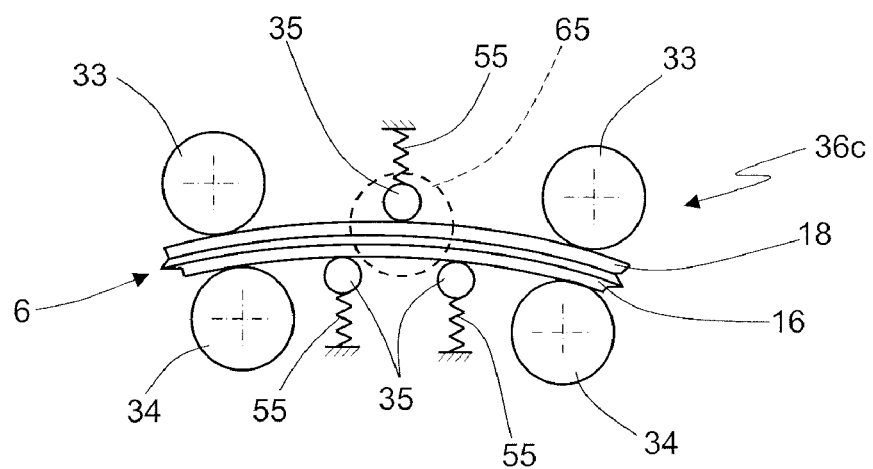
FIG. 6 shows a schematic view of the phase shown in FIG. 3, and FIGS. 7 to 9 show comparative micrographs of sealing carried out on the same type of bellows using different methods.

Finally, with reference to the diagram shown in FIG. 6, a possible but not preferred variant 36c of the apparatus 36 in FIG. 3 could include three idler rollers 35, radially loaded by springs 55 positioned radially in part on the outside and in part on the inside of the collar 6, like the vertices of a triangle, with the hole 65 placed at the centre of this triangle and with two motorized rollers 33 positioned immediately upstream and downstream of the rollers 35 and radially opposed on the inside of the collar 6 by idler rollers 34, these also possibly loaded by springs 55 or carried by actuators 51.

The invention shall now be described still further via a practical working example.

EXAMPLE

A series of bellows 1 of identical dimensions have been butt-sealed on the collar rim using different methods.
1) Sealing Using ERW:
(Electrical Resistance Welding)

Figure 7:
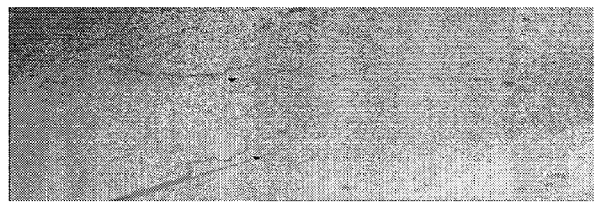

This is a well-known technique, for the realization of which numerous standard machines are available on the market. This technique, experimented by the Applicant, has been found to have numerous drawbacks, sufficient to cancel the advantages of rapid execution, as specified below:

the welds obtained must in any case be mechanically trimmed, triggering a series of uncontrollable defects (cracks), as their position is mainly on the inner side of the weld nugget, these defects add to those (cracks) that are created during the welding phase, both on the surface and in the fusion zone, which are generally irreparable, with consequent scrapping of material already in a finished or semi-finished state (see micrograph of welding obtained, shown in FIG. 7), and trimming presents other negative aspects, such as the possibility that the cutting direction undergoes deviation, the forces tending to alter the original shape of the collar, and the resultant surface after the operation is highly work-hardened (with hardness values above 500-600

Vickers), particularly on nickel-chromium-iron and/or nickel-chromium-iron-molybdenum alloys.

2) Sealing Using Laser Welding:

The problems encountered with the previous technique have induced the Applicant to experiment other welding techniques that are rapid and can be automated, such as those of laser welding.

2.1) First Experimentation:
Tangential Sealing of Collars

A laser beam is projected tangentially on the collar, using various power ratings and operating speeds, making the collar rotate with respect to the (stationary) laser head.

All of the welding tests carried out in this manner failed, as it was not possible to remain on the rim of the collar; furthermore, the interposition of the spacer net between the walls caused interference with the welding phase.

Figure 8:
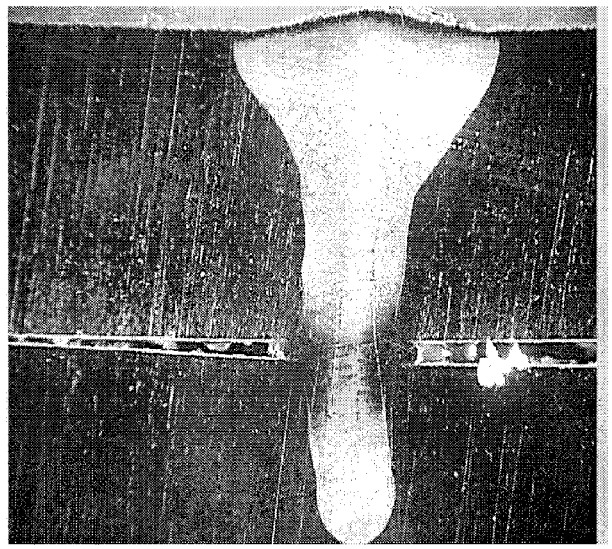

A significant example of failed tangential welding is shown in micrograph in FIG. 8.

2.2) Second Experimentation:
Butt Sealing of Collars

In this case, by working with the previously described apparatus, specially prepared by the Applicant, the experimentation is successful for both austenitic stainless steels and for nickel superalloys (for example, INCONEL 625).

Figure 9:
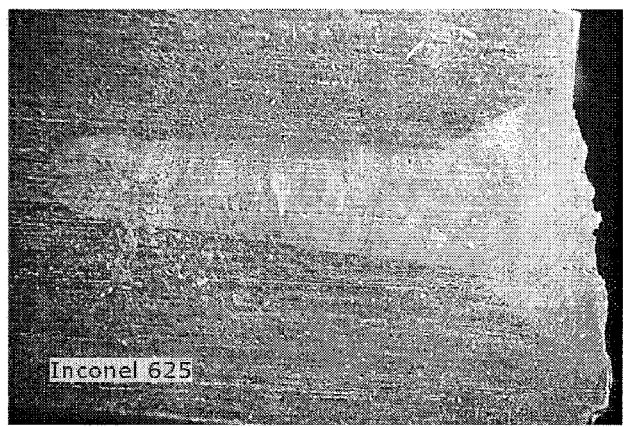

From the micrograph shown in FIG. 9, it can be noted how the fusion zone is uniform and free of defects.

Conclusions: the laser butt-sealing system, carried out by rigorously applying the previously described specific process parameters, guarantees surprisingly rapid execution times and qualitative aspects distinctly superior to all other possible welding processes, also in function of the other phases of bellows assembly.

Precisely in consideration of the final bellows-coupling welding, the advantage that derives from laser sealing is that of being able to weld with the awareness of not incurring leaks due to excessive fusion of the borders, because the laser's depth of penetration arrives to at least 2.6 mm.

The invention claimed is:

1. Method for sealing collars of double-wall bellows, in which a continuous butt-sealed rim of a collar defined by corresponding concentric ends, devoid of undulations, of a first, radially inner wall, and a second, radially outer wall, of the bellows is obtained as a continuous butt-weld bead on the corresponding rims, arranged radially adjacent to each other, of the ends of the first and second walls, comprising the phases of:

preparing the rims of the concentric ends of said first and second walls such that, before welding, they are radially spaced apart from each other by a preset clearance, butt welding the said previously prepared rims with a laser beam directed parallel to an axis of symmetry of the collar, making the latter turn around said axis to progressively expose an entire perimeter of said rims of the ends of the first and second walls to the laser beam, said laser welding phase being carried out by simultaneously pressing said rims against each other with a preset force via radial clamping means, so as to create a butt weld on the rims without filler metal and of a preset depth; wherein:

said preparation phase of said rims of the concentric ends of the first and second walls is carried out such that the rim of the second wall projects in an axial direction with respect to that of the first wall for a preset length.

2. Method according to claim 1, wherein said preset welding depth, measured in the axial direction, is at least twice the radial clearance present between said concentric ends of the first and second walls and is preferably equal to at least 2.6 mm.

3. Method according to claim 1, wherein said preset length is between 0.2 and 0.4 mm.

4. Method according to claim 1, wherein said preset radial clearance is not more than 0.3 mm.

5. Method according to claim 1, wherein said preset force is between 1 and 3 kg.

6. Method according to claim 1, wherein use is made of radial clamping means consisting of idler and/or motorized rollers, at least some of which are spring-loaded in a radial direction.

7. Method according to claim 1, wherein it also includes a calibration phase for the diameter of, and the radial clearance present between, said concentric ends forming the collar of said first and second walls, which is carried out by radially pressing said end of the inner wall against said end of the outer wall, from the inside out, via first calibrator means arranged inside the end of the first wall of the bellows and cooperating with second calibrator means arranged on the outside of the end of the second wall of the bellows.

8. Method according to claim 7, wherein via said calibration phase, said preset radial clearance present between the radially adjacent rims of said concentric ends of the first and second walls of the bellows is rendered substantially constant.

9. Method according to claim 7, including a chemical preparation phase for said radially adjacent rims including at least a drying phase and a solvent spray wash phase, wherein said calibration phase is carried out after the chemical preparation phase of said rims.

* * * * *